United States Patent
Kostakos

Patent Number: 6,154,770
Date of Patent: *Nov. 28, 2000

[54] INTERNETWORK COMMUNICATION SYSTEM USING TIERS OF CONFIGURABLE MULTIPLE BANDWIDTH CAPACITY MODES OF OPERATION

[75] Inventor: John S. Kostakos, Fenwood, N.J.

[73] Assignee: Merrill Lynch & Co. Inc., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/961,045

[22] Filed: Oct. 30, 1997

[51] Int. Cl.[7] .......................... G06F 15/16; G06F 15/173
[52] U.S. Cl. .......................... 709/217; 709/218; 709/226; 709/229; 709/231; 370/401; 370/422; 370/154; 370/901; 379/4; 379/93.09
[58] Field of Search ...................... 709/217, 218, 709/226, 229, 231, 234, 238, 249, 154, 422, 401; 370/154, 299, 216, 218, 226, 229, 227, 274, 279, 296, 401, 407, 408, 422, 901; 379/44, 93.09, 425, 191, 225

[56] References Cited

U.S. PATENT DOCUMENTS

| | | | |
|---|---|---|---|
| 5,161,152 | 11/1992 | Czerwiec et al. | 370/84 |
| 5,734,719 | 3/1998 | Tsevdos et al. | 380/5 |
| 5,737,526 | 4/1998 | Periasamy et al. | 709/241 |
| 5,787,072 | 7/1998 | Shimojo et al. | 370/231 |
| 5,818,842 | 10/1998 | Burwell et al. | 370/397 |
| 5,889,956 | 3/1999 | Hauser et al. | 709/226 |
| 5,996,021 | 11/1999 | Civanlar et al. | 709/238 |
| 6,041,059 | 3/2000 | Joffe et al. | 370/412 |
| 6,078,585 | 6/2000 | Kakuma et al. | 370/395 |

OTHER PUBLICATIONS

Comer, Douglas: Internetworking with TCP/IP, Principals, protocols & architecture(pp. 95–97), 1995.

*Primary Examiner*—Le Hien Luu
*Assistant Examiner*—Beatriz Prieto
*Attorney, Agent, or Firm*—Hopgood, Calimafde, Judlowe & Mondolino

[57] ABSTRACT

An internetwork that is especially designed to seamlessly compensate for a failure in the system, and to allow the testing of modifications to the system, without interrupting the normal systems operations. The internetwork is especially useful for financial services and related transaction data where the users of that data and/or services are located in multiple branch offices physically separated from each other and from the data and/or services desired. The internetwork includes a modularized communications system, wherein users are connected to specific modules, and each of the modules operates preferably at less than 50% capacity. In more preferred embodiments, each module includes dual (b)routers for connecting to a core tier and separate dual (b)routers for connecting to the users.

17 Claims, 6 Drawing Sheets

INTERNETWORK COMMUNICATION SYSTEM USING TIERS OF CONFIGURABLE MULTIPLE BANDWIDTH CAPACITY MODES OF OPERATION

BACKGROUND OF THE INVENTION

1. Field of the invention

This invention relates to internetwork communications systems structured to provide guaranteed communications between and among various financially-related devices and systems and the users thereof, preferably via modularized systems, and to methods for using the same. More specifically, this invention relates to a communications structure linking remote data, services, and branch offices, where the data typically is derived from such diverse sources as long-term databases and real-time transactions.

2. The State of the Art

Internetworking is the providing of complete connectivity with, and sometimes among, organizational members. In an organization, especially a large organization with multiple offices located at separate physical plants, communication of data is facilitated by an internetwork. Internetworking, and the related hardware and software, are per se well-known; e.g., Miller, Mark A., *Internetworking* (New York: M&T Books div. MIS:Press, 1995), and Martin, James, *Enterprise Networking* (Upper Saddle River, New Jersey: Prentice Hall PTR, 1996), the disclosures of which are incorporated herein by reference.

As the term internetwork implies, an internetwork generally comprises a number of smaller networks, typically on local scales, which are interconnected to each other. These smaller networks, which may be Local Area Networks (LANs), typically provide a communications network by which local computers (e.g., from personal computers, including workstations and/or dumb terminals, to minicomputers, and to main frames) intercommunicate. LANs oftentimes utilize phone lines (e.g., twisted pairs) to enable local computers to share data, send messages (such as e-mail), utilize pooled facilities (such as printer pools and modem pools, sets of similar hardware for use by all on the local network), and access third party or other exterior resources; LANs can also incorporate infrared (IR) and radio frequency (RF) communications devices by which remote users are provided access. There are four major well-known LAN architectures: Ethernet, token ring, ARCNET, and FDDI (fiber distributed data interface); as well as related derivative architectures (e.g. token bus).

The LANs are often connected to each other by a Wide Area Network (WAN). Wide area network data transmission links are most often implemented using conventional telecommunications facilities, such as ordinary telephone circuits. In the United States, these services are provided by "telecommunications common carriers"; in other countries these services are often provided by governmental postal, telephone, and telegraph (PTT) administrations. WAN data links are typically used to provide point-to-point connections between pairs of systems (such as LANs) typically located some distance from each other.

In both LANs and WANs, data are transferred much like letters are delivered by the postal service: the data is encapsulated or otherwise associated with addressing information that directs the data to a particular location. The data packet, or the format in which it is being sent, is typically called the frame. In these networks, there are communications protocols and routing information to assure data gets to its proper destination. As data is sent from a local user up the network (e.g., through the LAN to the WAN), additional data is added to the primary data being sent. The additional data includes routing information to direct the primary data to its intended recipient; as such, the frame includes the primary data and all of the additional data added along the way. As the frame data is received at the destination LAN, and sent to the intended recipient, the additional data is stripped from the primary data as the frame moves down through the internetwork, and finally the primary data is received at the desired destination without all of the routing and control data associated with the transmission.

Major problems occur with any communications system when it becomes necessary to compensate for periods of high volume traffic and/or period of catastrophe in which the system is disrupted. One method for compensating in the case of a catastrophe is described in co-pending application Ser. No. 306,382, filed Sep. 15, 1994, and titled "System For Enhanced Financial Trading Support", the disclosure of which is incorporated herein by reference in its entirety; in general, a secondary system normally designed for a given task (e.g., not related to trading, market services, or the like) is changed to operate as fit were a primary system designed for that task (i.e., specifically related to trading, market services, and the like) in the event of an emergency. Another problem yet to be addressed occurs when the physical portions of the internetwork fail, and especially where the failed component is part of the central communications backbone. Standard design practice for internetwork engineering (e.g., as described by Miller and by Martin, supra) is to engineer a 30% excess capacity into the hardware. While a 30% increase in bandwidth may likely compensate for some periods of high volume data traffic, it is clearly inadequate when, for example, one of the routers fails. This amount of excess capacity is also clearly inadequate when it is desirable to replace a router or other element of the internetwork, or when it is desirable to test a new component, because the data traffic normally handled by that component has no other path to travel.

SUMMARY AND OBJECTS OF THE INVENTION

Various objects of this invention are to provide a multi-tiered communications system interconnecting various financially-related systems and services, to provide such a system in a modularized structure, to provide backwards compatibility in such a system, and to provide such a system with a defined redundancy to guarantee communications through at least one of the tiers.

Yet other objects of this invention are to provide an internetwork system having dynamic load balancing and/or the soft reallocation of resources, preferably in real time. Another object is to provide a internetwork background that, from the user's viewpoint, is transparent to changes in the underlying internetwork design and hardware. Still another object is to provide an internetwork that is modular in design, facilitating upgrades to the system with predictable space and power requirements for the upgraded hardware.

Various objects of this invention are achieved in an embodiment of the invention comprising an internetwork preferably comprising a highway tier, a core tier, a serve tier (for servers and/or service provider distribution), and a local tier, wherein the tiers are interconnected and the system is sized to provide redundancy. In preferred embodiments, a tier (at least one) is comprised of a number of modules having excess capacity, most preferably where each module is identical to the others (within the tier, or within the same portion of the tier). Preferably, the modules are operated at an overcapacity of at least 100% (i.e., at ½, or 50%, capacity), more preferably at 150% overcapacity (i.e., at about ⅓, or 33%, capacity).

In another embodiment, this invention provides an internetwork, comprising at least two users at a local tier, a core tier including means for routing data, a telecommunications routing system effective to transmit data through the core tier between at least one of the users and another user or a remote data provider, wherein the core tier is designed to operate at not more than 50% capacity. In other embodiments, the internetwork further comprises a wide area network (WAN) and the local tier is connected to the core tier through the WAN, communication through the internetwork between the WAN and the core tier is by asynchronous transmission. The internetwork can further comprises a telecommunications routing system effective to transmit data between at least one of users and a remote data supplier or database. In preferred embodiments of the present internetwork, the internetwork data is scaleable and the remote data is accessible as non-scaleable data, and the internetwork further comprises means for translating the scaleable and non-scaleable data between the internetwork and the data supplier. Most preferably, the internetwork data protocol is transfer control protocol and/or internet protocol.

DETAILED DESCRIPTION OF SPECIFIC EMBODIMENTS

Figure 1A:
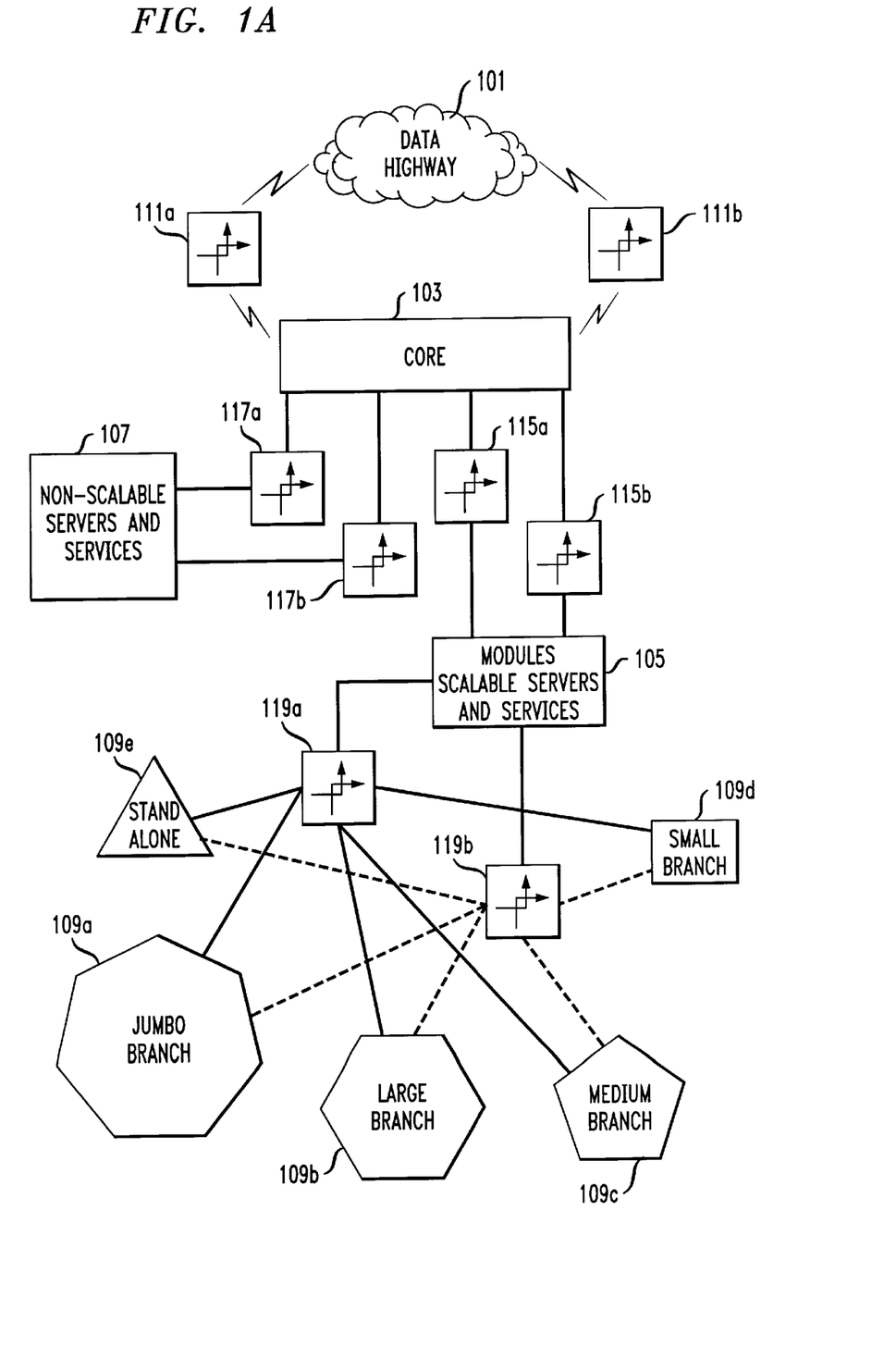
FIG. 1A depicts an idealized, logical view of one embodiment of an internetwork according to this invention.

One embodiment of the architecture of a multitiered system according to this invention is shown in FIG. 1A, in which a highway tier 101 from which data is retrieved and/or stored is connected to a core tier 103. Communications to and from the core tier may be sent to a serve tier. In this embodiment, the serve tier includes at least one module accommodating scalable servers and/or services 105 and preferably another module accommodating non-scalable servers and/or services 107. As noted in the Background section, various services (such as SNA) and various communications systems (e.g., X.25 Link Accessed Procedure Balanced protocol) utilized proprietary protocols. Access to and from these services and the data therein (i.e., two-way scalability) are provided by the dedicated routers or other hardware and/or software to convert non-scaleable data into scaleable data for transmission/reception anywhere on the internetwork. Access to non-scaleable data beneficially provides a backwards compatibility to data and services requiring proprietary or unique formats.

Continuing with FIG. 1A, the local tier, where the users access the normal operations of the system, can be of a size that ranges from a jumbo site 109a (e.g., over 150 users), to a large site 109b (e.g., 76–150 users), to a medium site 109c (e.g., 46–75 users), to a small site 109d (e.g., 7–45 users), and/or to a specialty site 109e (e.g., up to 6 users or users not physically connected to the internetwork). A preferable interconnection between and among the local sites (branch offices) and a market distribution system is described in U.S. Pat. No. 5,270,922 (the disclosure of which is incorporated herein by reference in its entirety).

The core tier can be considered the backbone of the present communications system. It is preferably composed of a series of routers as the communications backplane (preferably CISCO 7000 series, more preferably 7507 routers), and most preferably with FEIP (Fast Ethernet Interface Processor) cards, which provide 100 megabit per second ethernet connections to external devices. Attached to the backplane are a series of hubs (such as CISCO 5500 switched 100 Base-TX hubs). Dynamic hubs are generally preferably to static hubs to allow for changes to the system after it is constructed, while for certain applications and situations a static hub may be suitable; dynamic hubs, which allow reconfiguration of the communications ports on-the-fly, are also referred to as switched hubs. A hub can also be considered a multipoint repeater.

Figure 1B:
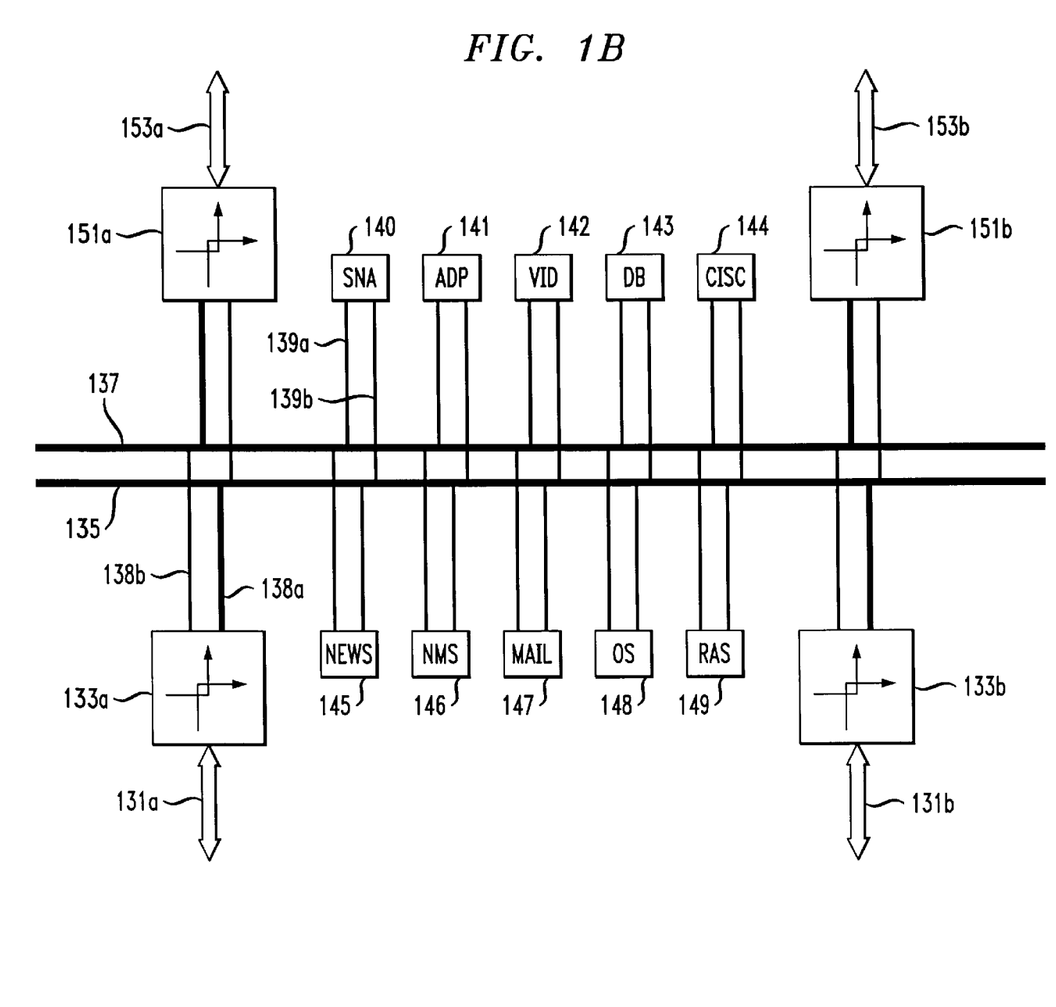
FIG. 1B depicts an idealized, logical view of the core communications backbone according to an embodiment of this invention.

FIG. 1B depicts in more detail a section of the core tier. Data 131a and 131b from and to separate sets of local tier users is sent via (b)routers 133a and 133b to parallel backplanes. The users can be located at one or more branch offices, and preferably the system is sized to accommodate about 15–20 branches per (b)router. The backplane communications are preferably analog 135 and digital 137; for example, one backplane can be comprised of twisted pairs, typical for telephone systems and capable of handling bandwidths up to about 100 MHz, and the other can be comprised of fiber optic (e.g., FDDI) and capable of handling bandwidths in the gigahertz range. Each of the local tier (b)routers 133a and 133b is connected to each of the backplanes, as shown by connections 138a and 138b. Also connected to the backplanes are various other modular components, such as ethernet switches, scaleable routers, and the like. Likewise, each of these modular components preferably provides connections to the backplanes via local ethernet (or other LAN) as well as by TCP/IP, as shown by the two connections 139a and 139b. These modular components provide connectivity to such services and servers as, for example, and without limitation, SNA 140, payroll and other automated data processing 141, video (as clips or in real-time via conferencing) 142, remote databases 143, CICS (Customer Information Control System or Host Access) 144, remote news services 145, network management software (NMS) 146, mail services 147 (such as e-mail), other operating systems (OS) and/or platforms 148 (such as the WINDOWS® NT® domain), and RAS (Remote Access Server) 149. Databases useful with the present invention include those that are maintained in-house, such as client information, including both personal and financial information, employee information, specialized databases related to investing (such as forecasting, arbitrage, historical trends, and the like), as well as outside databases which provide such information as real-time (and/or briefly delayed) securities, commodities, and/or currency quotations, news releases, tax/securities laws, as well as those that create a markets (e.g., wherein a market is exists on-line and/or trading is performed on-line connecting with an updated and dynamic database).

Each LAN architecture uses a particular data packet called a frame, which has a particular transmission format and order of data contained therein, including, for example, a preamble, a source identifier, a destination identifier, the data, and possibly the length of the frame (in bytes) and other associated information and/or data. Although virtually any communications protocol can be used, it is preferred that the protocol used at least at the core tier be TCP/IP (Transfer Control Protocol/Internet Protocol), and most preferably is a TCP/IP-only environment. When other protocols, or multiple protocols, are used, protocol-specific or multiprotocol routers are used. Accordingly, the data packet (frame) preferably comprises an outer intermodule envelope (such as ethernet for a LAN), an intramodule envelope (such as TCP/IP), possibly e-mail, then applications code, and finally data. Graphically, the data in the packet may be arranged as follows:

| Intermodule data (e.g., ethernet) | Intramodule data (e.g., TCP/IP) | e-mail | application code | data |
| --- | --- | --- | --- | --- |

Connected to the core tier via routers and, if necessary, ethernet switches, is a data highway (the highway tier). In operation, this layer is likely to be, and is preferably, a wide area network (WAN). Also connected to the core tier is the serve tier, which preferably comprises modules that connect non-scaleable databases and servers to the individual users at the local tier. The users at the local tier (discussed in more detail below) can be considered as remote nodes connected to the internetwork. In preferred embodiments, the modules are connected to the core tier via dedicated routers (e.g., CISCO 7507) and to the local tier via additional routers. Attached to the serve tier via separate hubs are all scaleable servers and services to which access is designed or desired to be provided to the users; such scaleable applications include, but not limited to, NMS (network management software) servers, electronic mail (e-mail), and the like, especially to provide backwards compatibility between scaleable data (such as TCP/IP) and non-scaleable, proprietary-coded data. There are also virtual modules available for the specialty users at the local tier. Also attached to the serve tier are modules that serve as central sites for deployment for non-scaleable servers and services, such as SNA (systems network architecture devices) and databases (e.g., CD farms, Sybase database, Central Oracle Database Repository) and the like. Modules for these and other non-scaleable servers and services (e.g., SNA and other protocol-dependent data) are preferably connected to the core tier by dedicated routers (e.g., CISCO 7507). The backplane of the various modules comprising the serve tier also comprises switched hubs (e.g., 10/100 Base-TX using CISCO 5500 hubs).

The users at the local tier can be accommodated in the present internetwork as groups of various sizes, from relatively large, such as a corporate headquarters or, as is preferred for applications of the present invention, a financial services branch, to relatively small, such as a remote office having no physical connection to the internetwork or a travelling office or person having to communicate with other users connected to the internetwork. All users are connected to the core tier by the routers as described above. Specialty users having no designed connection to the internetwork are accommodated by generally available telecommunications channels, preferably T1 (a digital telecommunications facility available from common carriers), communicating with the hubs on the serve tier or via modem to a LAN on the local tier. Other specialty users (such as mobile users) can communicate with the internetwork through the core or local tier using traditional analog telephone lines or cellular (analog or digital) telephone pathways and modems.

The hardware generally associated with the local tier can be present physically at the location of those users. For example, assume a medium sized user at the local tier that is to be connected to the present internetwork. A telecommunications hardware chassis at such a location preferably has 13 slots allocated as follows: two slots for dual supervisor engines; two slots for dedicated routers (preferably having built-in servers for LAN, WAN, and ISDN communications); and nine slots for switched Ethernet hubs with twelve (12) communications ports each. Additional slots can be reserved for later expansion of Ethernet hubs depending upon the actual number of users at the site (i.e., six Ethernet hubs may be used initially). At least one of the routers preferably includes a built-in communications terminal server for out-of-bandwidth management (e.g., a specialty user communicating via cellular communications). Thus, a bridge/router ("brouter") can be used in place of a router if the types of users connected at a given local tier node warrants such. A router directs communications in a protocol-dependent manner (e.g., TCP and/or IP) whereas a brouter is a protocol-independent device that makes a forwarding or filtering decision based upon the data link in the frame.

A primary aspect of this invention is designed redundancy to assure communications continues in the event that one of the hubs and/or associated routers or brouters fails. The medium-sized user having a hardware configuration as just described is provided with intra-user communication via the Ethernet LAN at the user's physical location and is connected to the serve layer and data highway via the core tier. Given, for example, two users, the present system would supply each with the foregoing hardware to provide LAN capability to the user and communications capabilities between the local tier and the serve and data highway tiers.

The present system would also supply separate modules (and associated hubs), each of which operates (or is designed to operate) at 50% capacity to provide communications in the event that one of the modules fails, and to facilitate balancing the system. Thus, user(1) has a primary connection to module(1) and a secondary connection to module(2), and user(2) has a primary connection to module(2) and a secondary connection to module(1). Accordingly, if module (2) fails, user(2) can still communicate through the internetwork due to the redundancy and the connection to module(1).

Equipment costs for implementing the present system can be reduced further by using multiple modules. For example, three users can be connected to three modules each operating at 50% capacity so that, if one module fails, the 50% capacity of the other two modules is sufficient for each to handle its usual load as well as the user whose module has failed. Likewise, four modules can be operated at 67% (⅔rds) capacity to accommodate other users whose modules might fail. It is more preferred, though, to provide a module for each user wherein each module operates at 50% capacity. This architecture of dual modules operating at 50% capacity each simplifies determining (via software and/or hardware) to which other module the user will reconnect if the user's primary module should fail.

Figure 2:
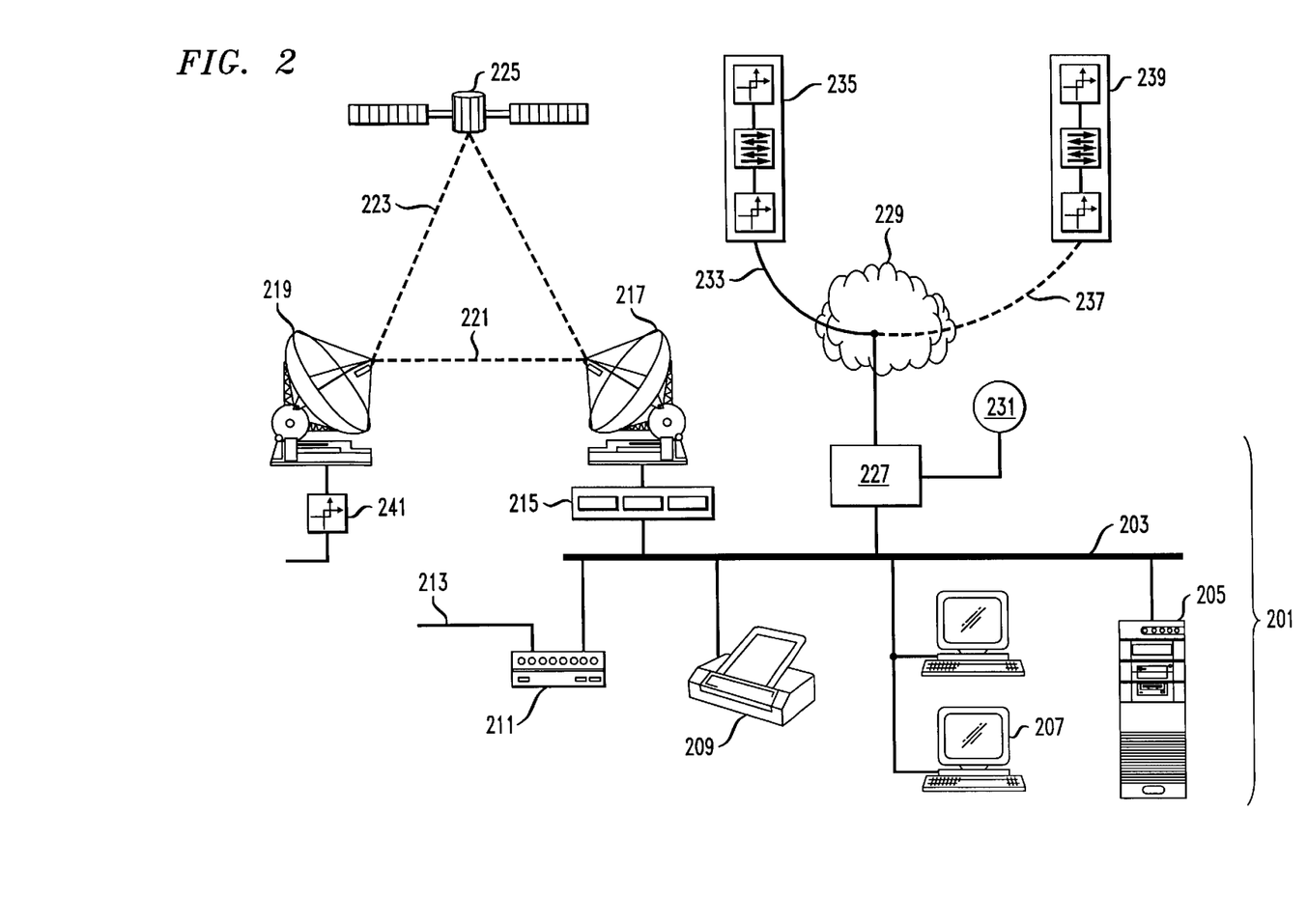
FIG. 2 depicts an idealized, logical view of a branch at the local tier, some of its components, and its connection to the internetwork.

As shown logically in FIG. 2, the user(s) at the local tier 201 generally communicate locally through a LAN with a common local communication channel or bus 203 controlled through a server 205 and to which are connected one or more workstations 207 (e.g., SPARC workstations or personal computers, preferably with Pentium® type processors, as well as a local modem, RAM, ROM, and permanent and/or replaceable storage media) and associated output devices (such as a printer 209). Access to remote services, databases, and/or applications can be provided by modem communications 211 connected to an outside phone line 213 (T1, ISDN, analog, etc.). It is also preferred to accommodate telecommunications remote services, databases, applications, and/or other (possibly remote and/or mobile) users through linking hardware 215 and an associated transceiver 217 that is in communication with another transceiver 219 associated with those remote services, databases, etc. The transmission can be line-of-sight 221 or indirectly 223 via a satellite relay 225. The remote transceiver 219 may also supply via broadcast real-time (or slightly delayed) market information and/or news from one or more service providers; the service provider(s) may broadcast themselves or the information can be taken from another medium and communicated via a router 241 to the remote transceiver. Each of the transceivers may be only a receiver or a transmitter depending upon the requirements of a particular location.

Figure 3:
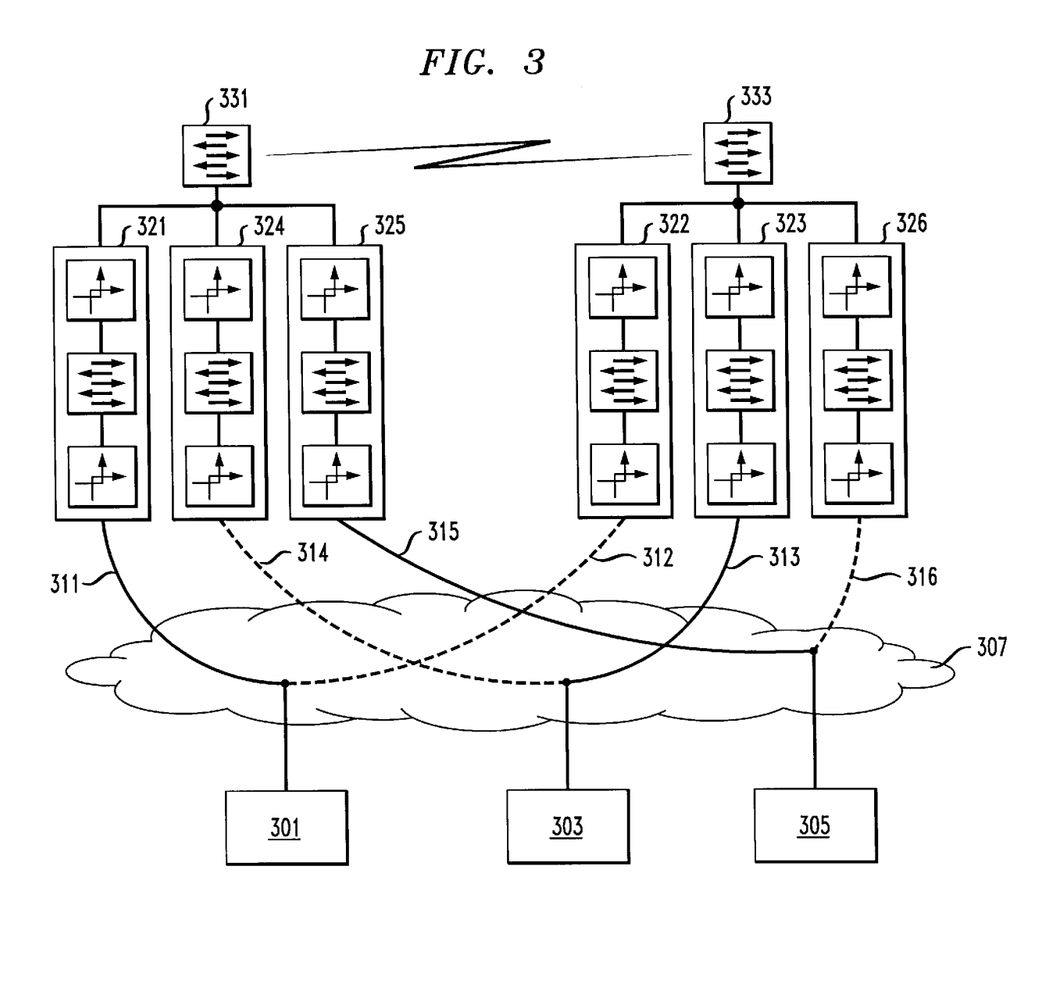
FIG. 3 depicts an idealized, logical view of an embodiment of multiple connections between the local tier and the core tier, through a WAN, providing the redundant aspect of this invention.

Continuing with FIG. 2, when a local user needs to access another user on the internetwork, the necessary information is coded into the frame protocol and transmitted by associated hardware 227 to the WAN 229 (the carrier information rate is preferably 384 Kbps at T1 access rate, but can be changed in accordance with actual data traffic design requirements) or directly 231 (preferably via ISDN at 128 Kbps). The frame protocol directs the information packet via a primary designated route 233 to a given primary core module 235 or, in the event of a failure of the primary module, through a secondary designated route 237 to an secondary core module 239. The branch office (b)router and distant end WAN (b)routers in the central site modules communicate via routing protocol and upon realizing the loss of communication with the distant end (b)router, modifies the frame protocol in order to make the information packet traverse the secondary designated route 237 to the secondary core module 239. Referring to FIG. 3, when the re-routed packet arrives at the secondary core module, the re-routed information packet will be passed across the links between (b)routers 333 and 331. The information packet will then be passed by the core and serve tiers to the appropriate module and application server for information processing.

In the event of an application server failure, the re-routing of information packets by the (b)routers may not occur as the (b)routers are not monitoring for this type of failure. In this instance, the application server or branch office software application is expected to time-out and initiate a new connection with modified destination information that will make the (b)routers redirect the data packet to the alternate module and associated application server.

As a broader overview, FIG. 3 depicts three users 301, 303, and 305 at the local tier, each of which communicates through the frame relay cloud provided by the WAN 307. Information from and to user 301 is directed normally via a primary communications link 311 via the frame protocol to a primary (i.e., normally used) module 321 at the core tier, as well as being distributed via a secondary link 312 to a secondary module 322 at the core tier. Likewise, data to and from user 303 is transmitted via a primary link 313 to a primary module 323 and also via a secondary link 314 to a secondary module 324; and similarly data from user 305 is communicated via a primary link 315 to a primary module 325 and also includes routing information via a secondary link 316 to a secondary module 326. Data communicated to and from each module and/or a remote database and/or service is sent via associated switches or hubs 331 and 333 from the core tier.

Figure 4:
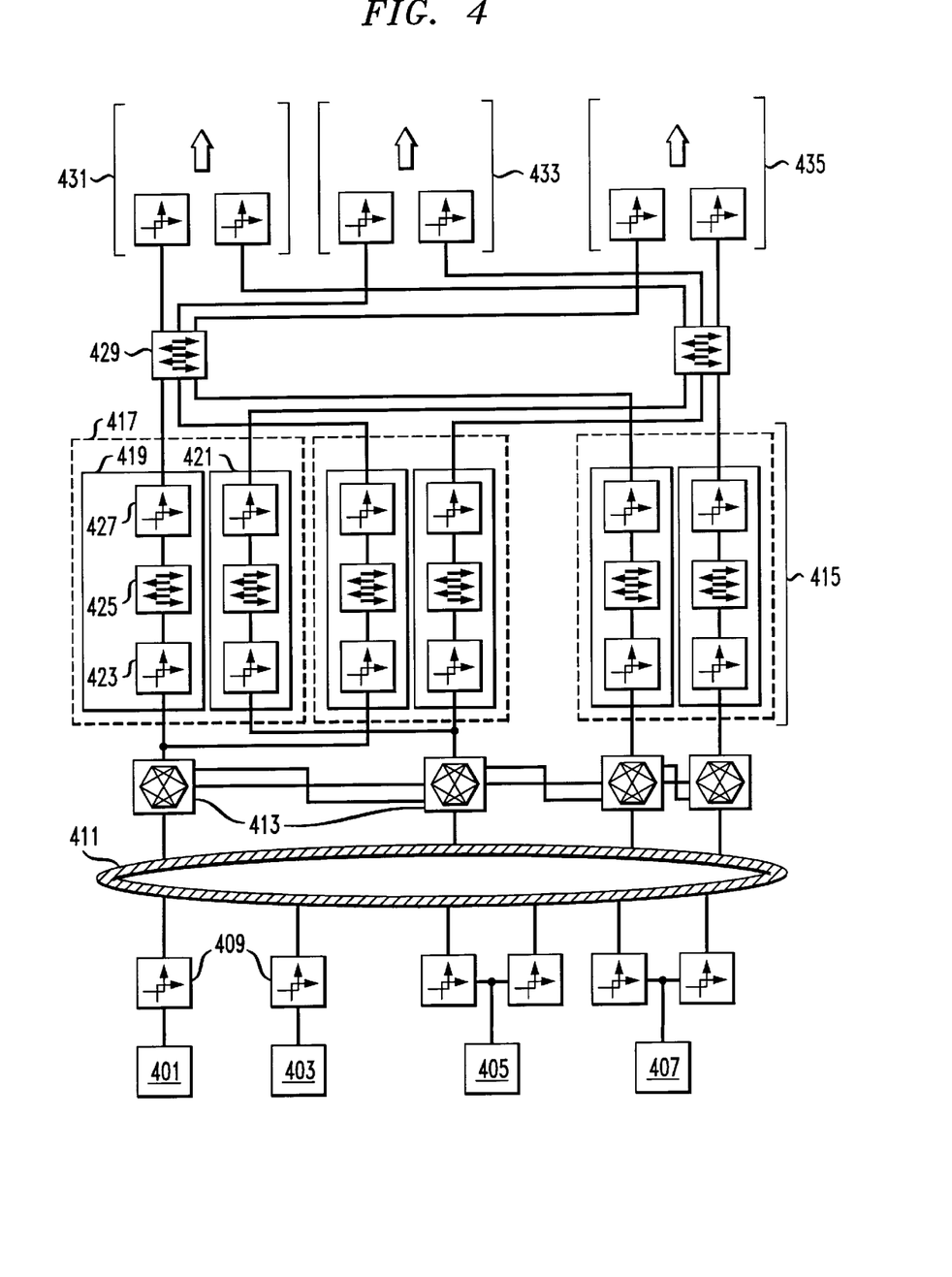
FIG. 4 depicts another idealized, logical overview of an embodiment of an internetwork according to the this invention.

As an even broader overview, FIG. 4 depicts an overview of the entire system. A number of users 401, 403, 405, and 407 at the local tier are connected via (b)routers 409 to a WAN 411. Smaller users (i.e., those having a lower data throughput), such as 401 and 403 can be associated with a single (b)router (depending upon the hardware specifications), whereas larger users, such as 405 and 407, may be connected via multiple (b)routers depending upon the desired data throughput capacity. Communication from the WAN to the core tier 415 is preferably accomplished by ATM (asychronous transfer mode) using a series of ATM switches 413; ATM is a well-known technology that uses a cell relay, a form of packet-switched data transmission that uses fixed-sized packets called "cells" (each of which is 53 octets in length). Preferably the ATM protocol is based on the known Class A service (connection oriented, and constant bit rate and timing relationship between source and destination systems). Instead of having a dedicated WAN, ATM services can be provided by a telecommunications service provider and used to implement a WAN data link. As shown in FIG. 4, the ATM switches form a backbone for the core tier to interconnect the users to the internetwork.

At the core tier, each set of modules 417 comprises a primary module 419 and a secondary module 421 for routing data through the internetwork. Each module includes a WAN (b)router 423 connecting the module to the WAN through the ATM switch bank, a switching device 425 for interpreting the routing protocol associated with the data, and a distribution (b)router 427 for transmitting the data to outside and/or other services. Data can be sent from one user at the local tier to another, in which case the data goes through the WAN and ATM switches to the (b)router, whereupon it is returned via essentially the same route. When data is sent to other than another user at the local tier on the internetwork, the data is sent through the distribution (b)router to another LAN switch bank 429. At this point, the data is may be (b)routed to a LAN having a proprietary protocol (e.g., SNA) via (b)router(s) 431, to a compatible data highway to access a database or outside service provider (e.g., for real-time pricing/quotes of securities, news services, and the like) via (b)router(s) 433, and/or to a LAN having a non-scaleable protocol, via associated (b)router(s) and, if necessary, LAN switches 435, to convert the protocol to that required by such non-scaleable applications and services.

As described above, designations "primary" and "secondary" are relative. Data from each user at the local tier will be directed via the transport layer of the frame relay protocol to a particular module.

As noted above, the modules are sized to provide at least 100% overcapacity; that is, the modules operate at most at 50% capacity with respect to a "sister" module servicing an equivalently-sized user at the local tier. In this way, if the primary module for any tier fails, the "sister" module, which is the "secondary module", has sufficient capacity to handle the data traffic, thereby avoiding a disruption in the internetwork. In the situation that there is a disaster at one of the locations, or a hardware or software malfunction, or problems with leased or dedicated telecommunications services (such as analog and/or T1 lines), that is effective to disable or totally disrupt one the modules, there will be sufficient capacity in the internetwork to handle the traffic.

Another benefit of the present invention is providing sufficient capacity at each module to accommodate the entire data traffic from an associated module. Thus, a further advantage of this invention is that new modules can be installed, and tested, without having to shut down the system or inconvenience or disrupt the local users primarily serviced by that module. This benefit is very significant in that it allows new components to be tested on-line, during normal operations, and if the component fails, the internetwork keeps on working without shutting out the users served by that module. Accordingly, the network appears to the users at the local tier always to be the same (e.g., it is transparent to changes, either in rerouting or when testing new modules).

In addition, the ability of the present system to reroute data traffic avoids a cascading of problems. For example, if modules were sized at only 30% extra capacity (a typical design criterion), then while they might handle a small emergency, there would be no guarantee that all of the traffic for which the system is sized will, in the event of a problem, get through.

Another benefit of the present system is achieved when programmable brouters (bridge-routers) are used. Real-time measurements of the bandwidth utilization for a particular brouter and/or module can be used for real-time balancing of the internetwork. For example, when the bandwidth utilization of a particular module reaches a given value, such as 50%, data traffic from one or more locations to that module can be rerouted to a module have a lower given bandwidth utilization, such as 25% or less.

Still another benefit of the present system is achieved with programmable brouters. Certain data must be unique and cannot reside in more than one location in the internetwork without errors occurring. For instance, an automatic teller machine (also called an ATM) communicates through the internetwork to provide remote banking functions, and the data associated with the account of the person using the ATM must be unique. Assume that two people (e.g., wife and husband) have access to a given bank account through the ATM; the data for this account may be stored along the data highway accessed via (b)routers 433 in FIG. 4. If each of these two people tried to make a withdrawal from the account simultaneously, an error could occur if each were allowed to make a withdrawal calculated on the local data at the ATM representing the account balance; each withdrawal might be less than the account balance while the sum of the two withdrawals could be greater than the account balance. The bank, of course, would be misusing funds if it were to allow each of the ATMs to dispense the requested withdrawal where the sum of the withdrawals is greater than the existing account balance. Using the present system, these types of unique data are tracked to assure that they are not replicated throughout the system and, instead, are unique within the internetwork. This can be achieved as the core tier contains servers and hosts that commonly support all users of the network: users at multiple locations can access the same application servers and, consequently, database information can be kept updated and accessible to all users.

EXAMPLE

Figure 5:
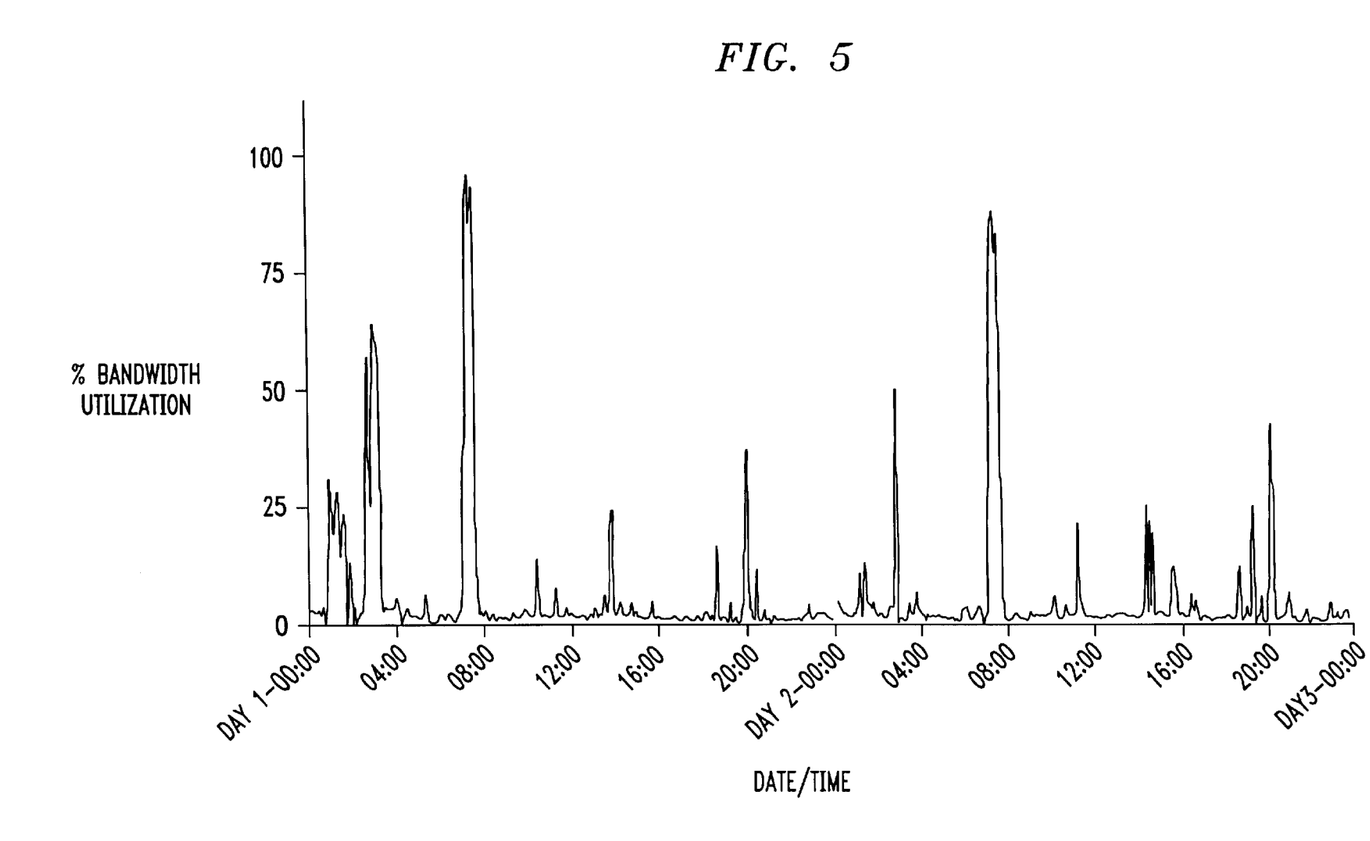
FIG. 5 depicts a graphical representation of the bandwidth utilization versus time of day during testing over a two day period.

FIG. 5 depicts the percent bandwidth utilization for a system comprised of two routers interconnected by a telecommunications facility using a T1 circuit. The transmissions passing/routed across the T1 circuit were monitored for 48 hours, beginning on midnight of Day 1 and ending at the midnight starting Day 3.

As shown in FIG. 5, the typical bandwidth utilization is, for the most part, not greater than about 10%. However, there are times during the day, typically between about 7:00 and 8:00 am, just before financial markets open, that phone lines may be busy or other impediments to data traffic occur. By use of the present system, FIG. 5 shows that the significantly increased bandwidth requirements can be accommodated on a moments' notice without disruption to the local users or the entire system.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. An internetwork communications system for use with a plurality of interconnected networks and comprising:
   (a) a core tier comprising a plurality of routers each adapted for connection to one or more of the interconnected networks, wherein the core tier is adapted to provide a maximum bandwidth capacity; and
   (b) a local tier adapted to interface one or more endpoint devices with one or more of the interconnected networks;
   wherein the core tier is programmed to operate at no greater than 50% of the maximum bandwidth capacity in a normal mode of operation, and greater than 50% of the maximum bandwidth capacity in a disaster mode of operation.

2. The internetwork communications system of claim 1 wherein the local tier includes a first endpoint device coupled to a first network and a second endpoint device coupled to a second network, and the core tier is adapted to provide communications between the first network and the second network so as to permit data to be transferred between the first and second endpoint devices.

3. The internetwork communications system of claim 2 further comprising a wide-area network (WAN), wherein the local tier is coupled to the core tier through the WAN.

4. The internetwork communications system of claim 3 wherein the WAN communicates with the core tier through asynchronous communications.

5. The internetwork communications system of claim 3 wherein the WAN communicates with the core tier through synchronous transmission.

6. The internetwork communications system of claim 3 wherein the first endpoint device is a remote data supplier.

7. The internetwork communications system of claim 6 wherein the remote data supplier is a database.

8. The internetwork communications system of claim 7 wherein data on the internetwork communications system are scaleable data and data stored on the database are accessible as non-scaleable data, and the internetwork communications system further includes a translation mechanism for translating the scaleable and non-scaleable data between the internetwork communications system and the remote data supplier.

9. The internetwork communications system of claim 2 wherein the data are transferred using any of transfer control protocol (TCP) and/or internet protocol (IP) communications.

10. An internetwork communications system comprising:
    (a) a plurality of interconnected networks including at least a first local-area network (LAN) and a second LAN situated at a location remote from the first LAN;

(b) a wide area network (WAN) adapted to provide communications between the first and second LANs;

(c) a core tier for routing communications between the first and second LANs through the WAN, the core tier comprising a plurality of routers each adapted for connection to one or more of the interconnected networks;

wherein the core tier is equipped with a communications capacity that is at least 50% greater than that required by the plurality of interconnected networks.

11. The internetwork communications system of claim 10 wherein the first and second LANs provide a local tier adapted for coupling to one or more endpoint devices.

12. The internetwork communications system of claim 11 wherein the local tier includes a first endpoint device coupled to the first LAN and a second endpoint device coupled to the second LAN.

13. The internetwork communications system of claim 12 wherein the core tier is adapted to provide communications between the first LAN and the second LAN so as to permit data to be transferred between the first and second endpoint devices.

14. The internetwork communications system of claim 13 wherein the second endpoint device is a database.

15. The internetwork communications system of claim 14 wherein the database provides quotations of at least one of securities, commodities, and currencies.

16. The internetwork communications system of claim 14 wherein the database provides news.

17. The internetwork communications system of claim 14 wherein the database provides customer information.

* * * * *